US009251399B2

(12) United States Patent
Hwang et al.

(10) Patent No.: US 9,251,399 B2
(45) Date of Patent: Feb. 2, 2016

(54) METHOD OF SEPARATING OBJECT IN THREE DIMENSION POINT CLOUD

(75) Inventors: Hyo Seok Hwang, Seoul (KR); Kyung Shik Roh, Seongnam-si (KR); Suk June Yoon, Seoul (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 361 days.

(21) Appl. No.: 13/585,282

(22) Filed: Aug. 14, 2012

(65) Prior Publication Data

US 2013/0051658 A1    Feb. 28, 2013

(30) Foreign Application Priority Data

Aug. 22, 2011  (KR) .................. 10-2011-0083285

(51) Int. Cl.
*G06K 9/00*       (2006.01)
*G06T 7/00*       (2006.01)

(52) U.S. Cl.
CPC .......... *G06K 9/00201* (2013.01); *G06T 7/0081* (2013.01); *G06T 2207/10028* (2013.01); *G06T 2207/20141* (2013.01)

(58) Field of Classification Search
None
See application file for complete search history.

(56) References Cited

U.S. PATENT DOCUMENTS

2011/0293137 A1* 12/2011 Gurman et al. ............... 382/103
2012/0075342 A1*  3/2012 Choubassi et al. ............ 345/633

OTHER PUBLICATIONS

Rusu's Dissertation titled "Semantic 3D Object Maps for Everyday Manipulation in Human Living Environments." Proof of publication is provided using a screen capture from Google books, showing a 2009 publication.*
Rusu et al. "Model-based and Learned Semantic Object Labeling in 3D Point Cloud Maps of Kitchen Environments," published 2009.*
Huang et al. "Consolidation of Unorganized Point Clouds for Surface Reconstruction," published in 2009.*
Extended European Search Report dated May 16, 2014 from European Patent Application No. 12181090.7.
Rusu, "Semantic 3D Object Maps for Everyday Manipulation in Human Living Environments", PhD thesis, Technische Universität München, Sep. 18, 2009, XP007922669, 284 pages.
Rusu & Cousins, "3D is here: Point Cloud Library (PCL)", Robotics and Automation (ICRA), 2011 IEEE International Conference On, IEE, May 9, 2011, XP032034386, 4 pages.
"Chapter 4: Nonparametric Techniques", In: Richard O. Duda, Peter E. Hart, David G. Stork: "Pattern Classification, $2^{nd}$ Edition", Jan. 1, 2001, XP002340082, pp. 164-177.

* cited by examiner

*Primary Examiner* — Vu Le
*Assistant Examiner* — Alexander J Lesnick
(74) *Attorney, Agent, or Firm* — Harness, Dickey & Pierce, P.L.C.

(57) ABSTRACT

A method of separating an object in a three dimension point cloud including acquiring a three dimension point cloud image on an object using an image acquirer, eliminating an outlier from the three dimension point cloud image using a controller, eliminating a plane surface area from the three dimension point cloud image, of which the outlier has been eliminated using the controller, and clustering points of an individual object from the three dimension point cloud image, of which the plane surface area has been eliminated using the controller.

16 Claims, 23 Drawing Sheets
(17 of 23 Drawing Sheet(s) Filed in Color)

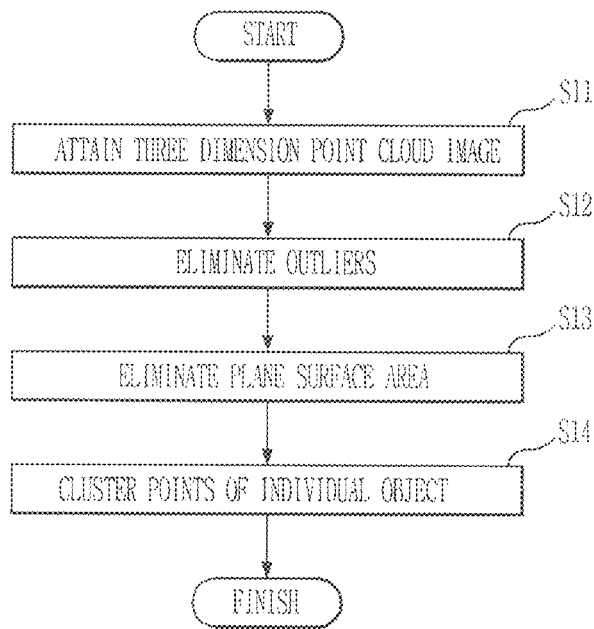

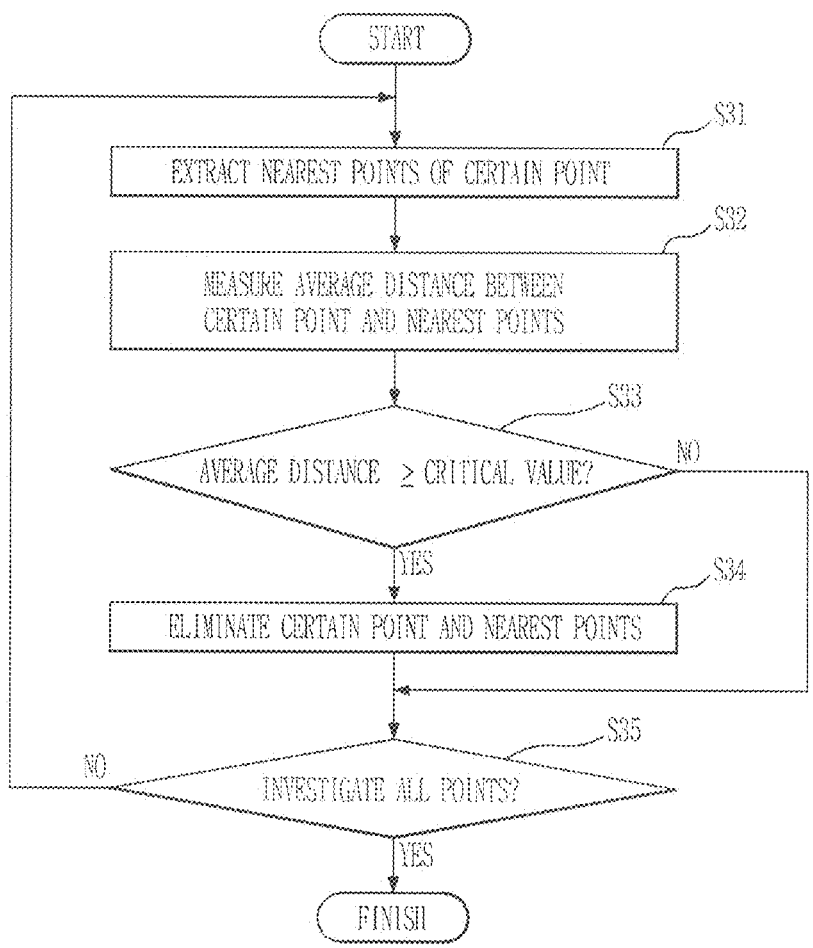

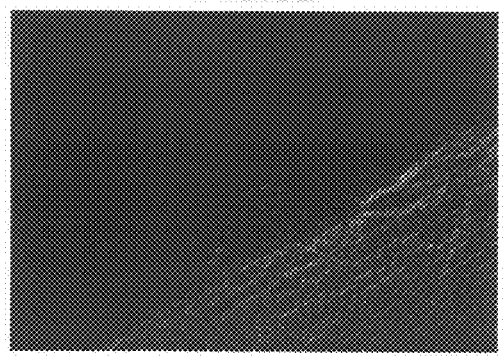

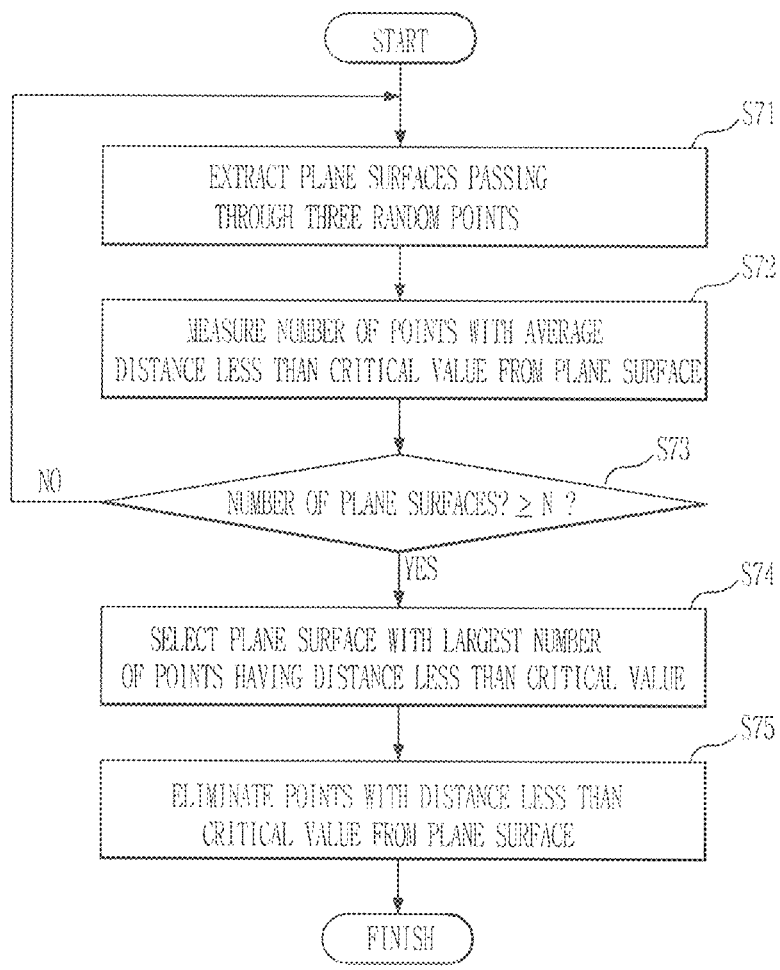

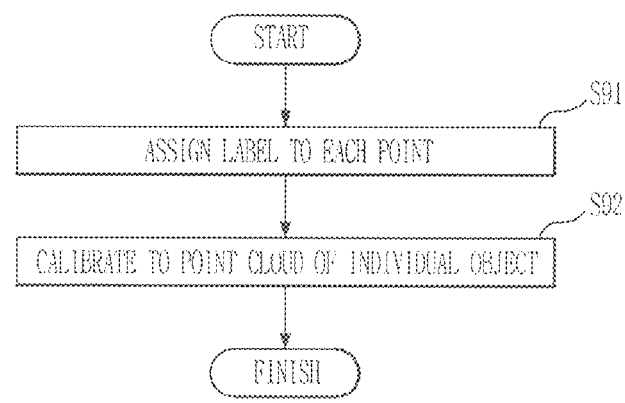

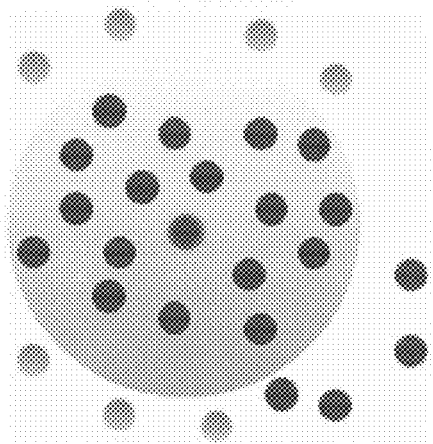

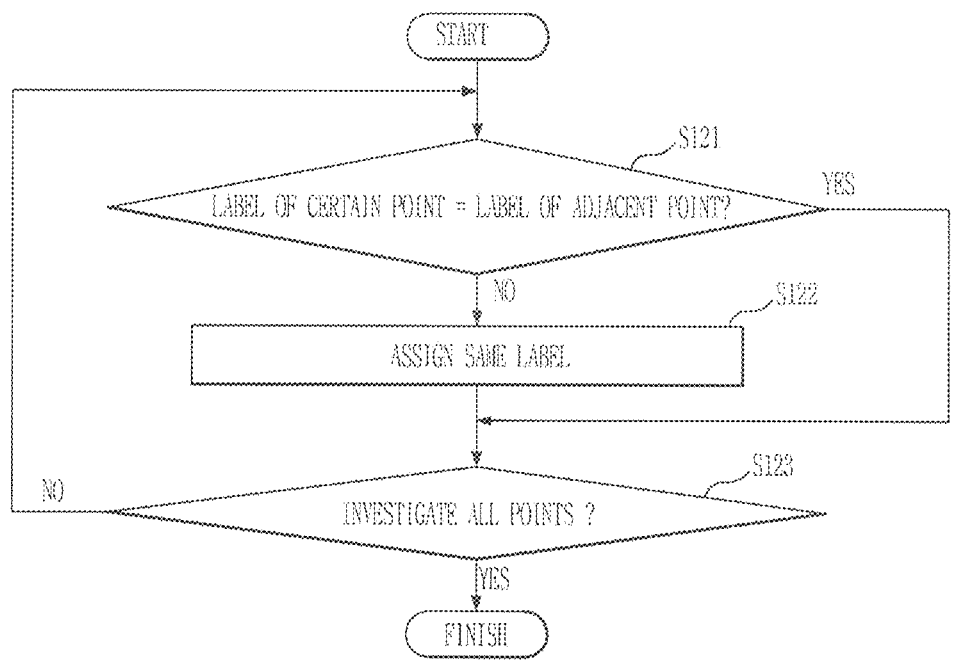

METHOD OF SEPARATING OBJECT IN THREE DIMENSION POINT CLOUD

CROSS-REFERENCE TO RELATED APPLICATIONS

This application claims the priority benefit of Korean Patent Application No. 10-2011-0083285, filed on Aug. 22, 2011 in the Korean Intellectual Property Office, the disclosure of which is incorporated herein by reference.

BACKGROUND

1. Field

Embodiments relate to a method of separating an object in a three dimension point cloud, and more particularly to a method of separating an object in a three dimension point cloud in which points of an individual object in a three dimension point cloud are clustered for a robot to recognize the object.

2. Description of the Related Art

For a robot to recognize the position of an object and estimate the posture of an object, a method using color images and a method using three dimension point clouds are used. The method using the three dimension point clouds is performed by using the geometric position relation between a point cloud of a particular object on the database and a point cloud input thereinto.

Prior to performing the objection recognition and object posture, an important process is to perform a clustering by separate cluster a point cloud area regarded as an individual object on an the three dimension point cloud image. Such a clustering is a preprocessing that needs to be performed prior to the object recognition and object posture; and the results from the preprocessing affect significantly the accuracy and speed of a robot in recognizing an object.

Conventionally, a technology that recognizes point clouds as individual objects by labeling three dimension point clouds has been attempted, as well as a technology that traces objects by eliminating outliers on the three dimension point cloud image.

SUMMARY

In an aspect of one or more embodiments, there is provided a method of separating an object in a three dimension point cloud in which an outlier containing necessary information and a plane surface area having an individual object placed thereon are eliminated from a three dimension point cloud image and a label assigning is performed, thereby clustering points of the individual object.

In an aspect of one or more embodiments, there is provided a method of separating an object in a three dimension point cloud is as follows. An image acquisition unit (acquirer) acquires a three dimension point cloud image on an object. A control unit eliminates an outlier from the three dimension point cloud image. The control unit (controller) eliminates a plane surface area from the three dimension point cloud image, of which the outlier has been eliminated. The control unit (controller) clusters points of an individual object from the three dimension point cloud image, of which the plane surface area has been eliminated.

The image acquisition unit includes a stereo camera, a Time of Flight (TOF) camera, a Laser Range Finders (LRF) sensor, or a kinect sensor.

In the eliminating of the outliner, a downsampling is conducted on the three dimension point cloud image at a predetermined rate, and an outlier is eliminated from the three dimension point cloud image which has been downsampled.

In the eliminating of the outlier, it is determined whether a distance between each point of the three dimension point cloud image and nearby points adjacent to the each point is equal to or greater than a critical value.

The eliminating of the outlier is performed as follows. The control unit extracts a predetermined number of nearest points with respect to each point of the three dimension point cloud image. The control unit measures an average distance between the each point and the nearest points. The control unit eliminates the each point and the nearest points if an average distance between the each point and the nearest points is equal to or greater than a critical value.

In the eliminating of the outlier, if a distance between each point of the three dimension point cloud image and a position at which the three dimension point cloud image on the object is acquired is equal to or greater than a predetermined distance, the control unit eliminates the each point.

In the eliminating of the plane surface area, it is determined whether a distance between each point and a plane surface of the three dimension point cloud image is equal to or greater than a critical value.

The eliminating of the plane surface area is performed as follows. The control unit extracts a predetermined number of plane surfaces, each plane surface passing through three points on the three dimension point cloud image, and measures the number of points having a distance that is less than a critical value with respect to each plane surface on the three dimension point cloud image. The control unit selects a plane surface having a largest number of points having a distance less than the critical value with respect to each plane surface. The control unit eliminates each point in case when a distance between the each point on the three dimension point cloud image and the selected plane surface is less than the critical value.

The clustering of points of an individual object is performed as follows. The control unit assigns a label to each point on the three dimension point cloud image. The control unit matches each point cloud segment assigned with same label, thereby calibrating to a point cloud of an individual object.

The assigning a label to each point is performed as follows. The control unit extracts adjacent points that are within a predetermined distance with respect to each point on the three dimension point cloud image. The control unit assigns a same label to the each point and to the adjacent points if the number of the adjacent points is equal to or greater than a critical value.

In the calibrating to a point cloud of an individual object, if a label of each point on the three dimension point cloud image is different from a label of an adjacent point that is within a predetermined distance with respect to the each point, the control unit assigns the each point on the three dimension point cloud image and the adjacent point with same label.

In an aspect of one or more embodiments, an outlier containing unnecessary information on the three dimension point cloud image may be eliminated, thereby reducing the time consumed for clustering without affecting the performance in clustering cluster point objects. Also, an individual object is separated by eliminating a plane surface area where the individual object is placed on, thereby preventing the individual object and the plane surface area areas from being clustered as one single object. In addition, since the points of individual objects may be clustered and separated by assigning labels by assigning labels, thereby improving the precision and the speed in identifying an object with respect to the point cloud of a particular object on the database.

According to another aspect of one or more embodiments, there is provided at least one non-transitory computer readable medium storing computer readable instructions to implement methods of one or more embodiments.

BRIEF DESCRIPTION OF THE DRAWINGS

The patent or application file contains at least one drawing executed in color. Copies of this patent or patent application publication with color drawing(s) will be provided by the Office upon request and payment of the necessary fee. These and/or other aspects of embodiments will become apparent and more readily appreciated from the following description of the embodiments, taken in conjunction with the accompanying drawings of which:

FIG. 1 is a flow chart schematically illustrating a method of separating an object in a three dimension point cloud according to an embodiment;

FIG. 3 is a flow chart schematically illustrating a process of eliminating an outlier according to an embodiment;

FIGS. 5A and 5B are schematic views showing a result of a process in eliminating an outlier according to an embodiment;

FIG. 7 is a flow chart schematically illustrating a process of eliminating a plane surface area according to an embodiment;

FIG. 9 is a flow chart schematically illustrating a process of clustering points of an individual object according to an embodiment;

FIGS. 11A to 11D are views schematically showing a process of assigning a label according to an embodiment;

FIG. 12 is a flow chart schematically illustrating a process in calibrating point clouds for an individual object.

DETAILED DESCRIPTION

Figure 2A:
FIG. 2A is a schematic view illustrating a two-dimension image on an object according to an embodiment.

Reference will now be made in detail to embodiments of which are illustrated in the accompanying drawings, wherein like reference numerals refer to like elements throughout.

FIG. 1 is a flow chart schematically illustrating a method of separating an object in a three dimension point cloud according to an embodiment.

Referring to FIG. 1, according to a method of separating an object from a three dimension point cloud, first, an image acquisition unit (image acquirer) acquires a three dimension point cloud image of an object (S11). A method of acquiring a three dimension point cloud image of an object will be explained with reference to FIG. 2 in detail.

Outliers are eliminated by a control unit (controller) from the three dimension point cloud image of an object acquired (S12). The eliminating stage of outliers is the process to eliminate unnecessary portion from the three dimension point cloud image. Outliers represent points having unnecessary information in recognizing an object, the unnecessary information being generated as a result of electrical noise or irregular reflection of infrared light while acquiring the three dimension point cloud image of an object.

Meanwhile, if a clustering operation is performed on all the points on the three dimension point cloud image, the cost of time and operations consumed is huge. Accordingly, the total number of the points needed to perform a clustering operation on, through downsampling, may maybe reduced prior to eliminating outliers and then a clustering is performed on the downsampled points. The outliers that exist independently are not many in terms of numbers at this time, and independent outliers that remain through the process of elimination may be eliminated during the clustering process; and therefore, the reduction of performance in clustering points due to downsampling is not significant.

The process of downsampling of a three dimension point cloud image is performed through the following [Mathematical formula 1] and [Mathematical formula 2]:

$$P=\{p_1, p_2, \ldots, p_n | n\}$$ [Mathematical formula 1]

Here, in [Mathematical formula 1], P represents the set of all the points on the three dimension point cloud image, and n represents the number of points.

$$P^* = \left\{p_1, p_2, \cdots, p_m \,\middle|\, m = \frac{n}{10}\right\}$$

Here, in [Mathematical formula 2], P* represents the set of points that downsampling is performed on, and m represents the number of points that downsampling is performed on. For a reference, downsampling may be performed at a rate of 10%.

Therefore, according to [Mathematical formula 1] and [Mathematical formula 2], downsampling may be performed on the three dimension point cloud image at a predetermined rate, and the eliminating process of outliers is performed on the three dimension point cloud image after downsampling is performed.

The control unit (controller) eliminates a plane surface area on the three dimension point cloud image after eliminating outliers (S13). In general, objects lie on a certain plane surface area, such as floor or a table. Therefore, prior to performing a process of clustering individual objects, a control unit needs to eliminate a floor area or a table area from the three dimension point cloud image. A process of eliminating a plane surface area according to an embodiment is to extract an optimal plane surface, and by using an optimal surface extracted, then eliminate a floor area or a table area from the three dimension point cloud image. A method of eliminating a plane surface area will be explained with reference to FIG. 7 in detail.

A control unit clusters points of individual objects from the three dimension point cloud image after eliminating a plane surface area (S14). In general, when a point cloud on the three dimension point cloud image is coincided with a point cloud of a certain object on the database, the point cloud on the three dimension point cloud image is recognized as a certain object. Therefore, in order to recognize an object, a process in separating and clustering points which represent an individual object is needed. A process of clustering points of an individual object according to an embodiment is performed by assigning a label to each point on the three dimension point cloud image. That is, the points that represent an object are assigned to a same label. A method of clustering an individual object will be explained with reference to FIG. 9 in detail.

Figure 2B:
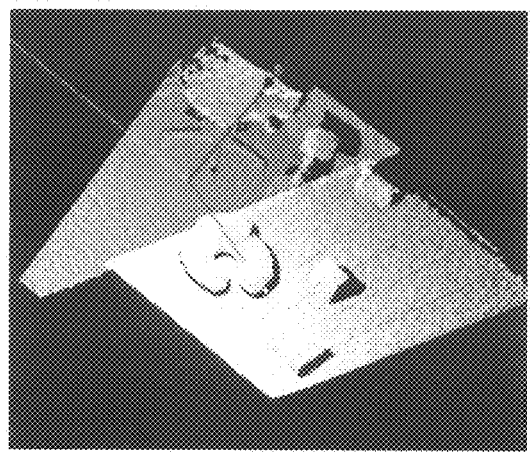
FIG. 2B is a schematic view illustrating a three dimension point cloud image on an object according to an embodiment.

FIG. 2A is a schematic view illustrating a two-dimension image on an object according to an embodiment. FIG. 2B is a schematic view illustrating a three dimension point cloud image on an object according to an embodiment.

Referring to FIG. 2A and FIG. 2B, the two-dimensional image of an object represents an image of individual objects placed on a table. From the two-dimensional image as such, the xy-coordinates of an object may be attained; however, the information on a distance between an object and a position at which the object is acquired may not be attained.

Meanwhile, a three-dimension point cloud image, in addition to the xy-coordinates, include the information of a z-coordinate, and a method of acquiring such a three dimension point cloud image s through a stereo camera, a Time of Flight (TOF) camera, a Laser Range Finders (LRF) sensor, or a kinect sensor.

For example, a geometric model of a stereo camera, in general, has a structure of two cameras facing at one object. Stereo image are defined as an images of a point in a space taken from several perspectives; and the coordinates of a stereo image is converted into three-dimensional coordinates.

A distance between an object and a stereo camera may be attained by a triangulation method, and by using the distance attained, a z-coordinate of an object may be attained. Here, it is assumed that the xy coordinate plane of an image and the xy-coordinate plane on a space are in parallel.

Meanwhile, a stereo matching may be divided, according to the matching primitive, into a feature based technique and an area based technique. The matching primitives used for a featured based technique are a zero-crossing point, an edge, a corner, a ridge, a conical curve; the matching primitives used for an area based technique are the shape, the average brightness, and the size of areas having same brightness information.

In addition, a TOF camera attains range information, first of all, by calculating the time taken for an ultrasonic wave to travel from a transmitter to an object, and then reflected from the object to a receiver. The figure attained in terms of time taken is then divided by the speed of the ultrasonic wave. A LRF sensor measures a distance by detecting a laser that is released from a transmitter to an object, and then reflected from the object to a receiver. A kinect sensor uses a RGB camera that is used to attain a color image along with an infrared light camera that attains a depth image of an object.

FIG. 3 is a flow chart schematically illustrating a process of eliminating an outlier according to an embodiment.

Referring to FIG. 3, a process of eliminating outliers includes a process that determines if the distance between an adjacent point and each point on the three dimension point cloud image is greater than a critical value to eliminates the outlier, and a process (not shown) that eliminates each point if the distance between each point on the three dimension point cloud image and the position at which the three dimension point cloud image of an object is greater than a predetermined value.

First, as for the process of eliminating outlier, a control unit, while investigating all the points on the three dimension point cloud image, extracts a predetermined number of nearest points with reference to each point on the three dimension point cloud image (S31). A process of extracting the nearest points follows the next [Mathematical formula 3] and [Mathematical formula 4]:

$$P_i^K = \{p_k \mid k \in K\} \quad \text{[Mathematical formula 3]}$$

$$P_i^K = \arg\min_{k \in K} \Sigma d(p_i, p_k) \quad \text{[Mathematical formula 4]}$$

PiK from [Mathematical formula 3] and [Mathematical formula 4] represents a set of a predetermined number of nearest points with reference to a point Pi, while K represents a set of index k. Here, the nearest point is defined as the most adjacent point with reference to each point, and the distance, which is defined as the closest distance, between each point and the nearest point may vary, depending on the predetermined number of nearest points.

The control unit measures an average distance between a certain point and the nearest points adjacent to the certain point (S32). If an average distance is greater than a critical value, a control unit determines the nearest points and the certain point as outliers; and then, the control unit eliminates the nearest points and the certain point from the three dimension point cloud image (S33 and S34). In other words, if the nearest points are distantly positioned with reference to the certain point, the control unit determines the certain point as an outlier, and not only eliminates the certain point, which is determined as an outlier but also the nearest points.

The control unit repeats the above process until all the points on the three dimension point cloud image are investigated (S35).

Figure 4A:
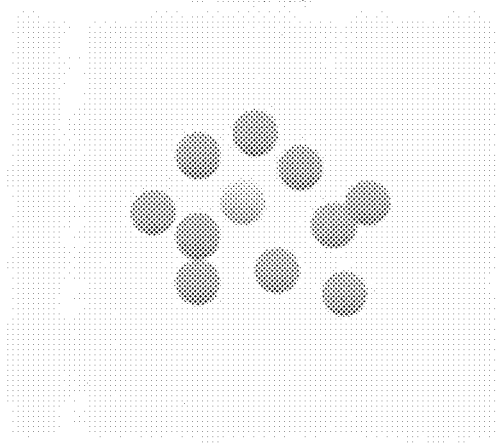
FIGS. 4A and 4B are schematic views showing a process of eliminating an outlier according to an embodiment.
Figure 4B:
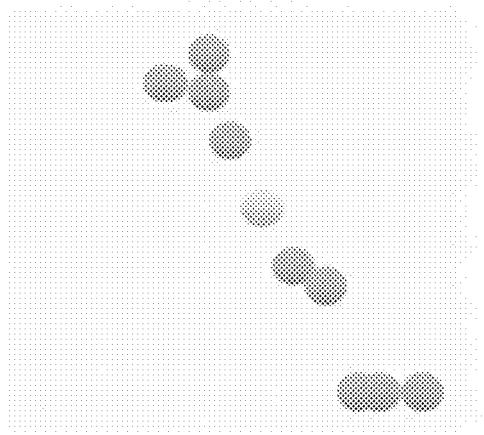

FIGS. 4A and 4B are schematic views showing a process of eliminating an outlier according to an embodiment.

Referring to FIGS. 4A and 4B, the nearest points extracted, while the predetermined number of the nearest points being set at 10, are illustrated. Referring to FIGS. 4A and 4B, the point in green represents a certain point, and the points in yellow represent the nearest points.

The certain point and the nearest points shown in FIG. 4A are assumed to as having an average distance less than a critical value; the average distance between the certain point and the nearest points while the certain point and the nearest points shown in FIG. 4B are assumed to as having an average distance equal to or greater than the critical value.

According to a process of eliminating outliers of an embodiment, the case in FIG. 4B shows a point cloud including sparsely disposed points and is determined as an outlier to be eliminated.

Figure 5B:
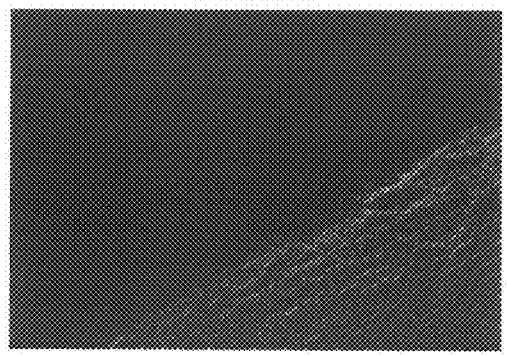

FIGS. 5A and 5B are schematic views showing a result of a process in eliminating an outlier according to an embodiment.

Referring to FIGS. 5A and 5B, a three dimension point cloud image prior to eliminating outliers is illustrated on FIG. 5A; a three dimension point cloud image after eliminating outliers is illustrated on FIG. 5B. The image shown in FIG. 5A has an outlier point cloud of outliers distant apart from a point cloud that takes most of the image. However, the image shown in FIG. 5B only a single point cloud is seen, since a process in eliminating outliers is performed according to an embodiment.

Figure 6A:
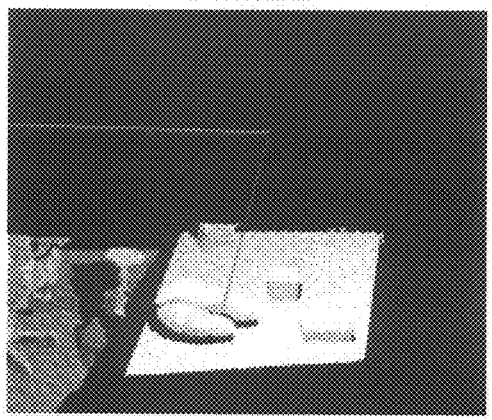
FIGS. 6A and 6B are schematic views showing a process of eliminating an outlier according to another embodiment.
Figure 6B:
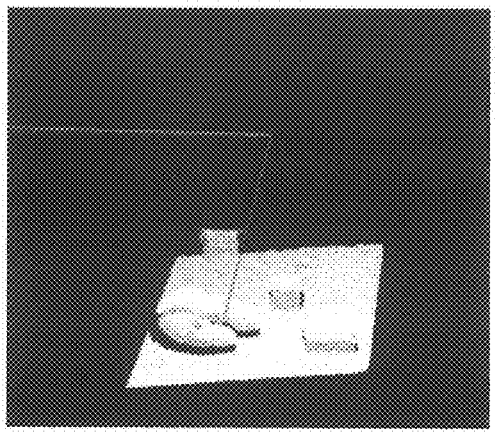

FIGS. 6A and 6B are schematic views showing a process of eliminating an outlier according to another embodiment.

Referring to FIGS. 6A and 6B, a three dimension point cloud image prior to eliminating outliers is illustrated on FIG. 6A; a three dimension point cloud image after eliminating outliers is illustrated on FIG. 6B. According to a process of eliminating outliers of another embodiment, if the distance between each point on the three dimension point cloud image and the position at which a three dimension point cloud image on an object is acquired is equal to or greater than a predetermined distance, the each point is eliminated In general, a three dimension point cloud image on an object is acquired at a distance in a range of 50 cm and 5 m; however, only a limited range of distance is desirable in such range when recognizing the object. Therefore, if outliers beyond the desired distance are eliminated in performing the clustering, the time for clustering point clouds may be significantly reduced.

Since the range information for each point corresponds to the z-coordinate of each point, the points having a z-coordinate value equal to or greater than a predetermined value is eliminated from the three dimension point cloud image, while the points having a z-coordinate value less than the predetermined value is remained.

When the three dimension point cloud image after eliminating outliers (as illustrated on FIG. 6b) is compared to the three dimension point cloud image prior to eliminating outliers, FIG. 6b illustrates that the image of the point cloud on the left is eliminated, since the determination is made that the point cloud on the left is located beyond the predetermined distance.

FIG. 7 is a flow chart schematically illustrating a process of eliminating a plane surface area according to an embodiment.

Referring to FIG. 7, first of all, the control unit extracts a plane surface that passes through three random points on the three dimension point cloud image (S71). Since the arithmetic operation (to calculate the process in eliminating plane surface areas with reference to all the points on the image) consumes a long time, a Psd, which is a downsampled point cloud, may be used as in the process of eliminating outliers.

A process of eliminating plane surface areas according to an embodiment, adopts a method of eliminating plane surface areas by determining whether the distance between each point on the three dimension point cloud image and the plane surface is less than a critical value.

To this end, three random points are extracted from a point cloud after downsampling and a plane equation of a plane passing the three random points is calculated. The calculation of the plane equation is performed by using one of the following formulas from [Mathematical formula 5] to [Mathematical formula 8]:

$$P_r^{sd} = \{p_{r1}, p_{r2}, p_{r3}\} \quad \text{[Mathematical formula 5]}$$

$$P_{r1} = (x_1, y_1, z_1) \; P_{r2} = (x_2, y_2, z_2) \; P_{r3} = (x_3, y_3, z_3) \quad \text{[Mathematical formula 6]}$$

$$L_i = \{a, b, c, d | ax + by + cz + d = 0\} \quad \text{[Mathematical formula 7]}$$

$$a = y_1(z_2 - z_3) + y_2(z_3 - z_1) + y_3(z_1 - z_2)$$

$$b = z_1(x_2 - x_3) + z_2(x_3 - x_1) + z_3(x_1 - x_2)$$

$$c = x_1(y_2 - y_3) + x_2(y_3 - y_1) + x_3(y_1 - y_2)$$

$$d = -(x_1(y_2 x_3 - y_3 z_2) + x_2(y_3 x_1 - y_1 z_3) + x_3(y_1 x_2 - y_2 z_1)) \quad \text{[Mathematical formula 8]}$$

Psd from [Mathematical formula 5] to [Mathematical formula 8] represents a set of a point cloud after downsampling is performed, and pr1, pr2, and pr3 represent three random points that a plane surface passes through. Li represents a plane surface that three random points pass through, while a, b, c, and d represent the coefficient of the plane equation.

The control unit measures the number of points that are less than a critical value in terms of the distance from a plane surface (S72). The control unit extracts a predetermined number of plane surfaces (N, for example) (S73). That is, the control unit extracts a predetermined number of plane surfaces each passing through three random points, and selects a plane surface having the largest number of points with a distance less than a critical value from the plane surface as optimal plane surface (S74). Such process consists of the following formulas from [Mathematical formula 9] and [Mathematical formula 11]:

$$L = L_i = \arg\min_i \sum_{j=1}^{n(sd)} d(L_i, P_j^{sd}) \quad \text{[Mathematical formula 9]}$$

$$d(L_i, P_j^{sd}) = \begin{cases} 1, \; \text{dist}(L_i, P_j^{sd}) < \text{threshold} \\ 0, \; \text{otherwise} \end{cases} \quad \text{[Mathematical formula 10]}$$

$$\text{dist}(L_i, P_j^{sd}) = \frac{|ax + by + cz + d|}{\sqrt{z^2 + b^2 + c^2}} \quad \text{[Mathematical formula 11]}$$

Referring to [Mathematical formula 9], L represents an optimal plane surface with largest number of points having less than a critical value in terms of distance from a plane surface, and n(sd) represents the number of points that downsampling is performed on. [Mathematical formula 10] represents a process of measuring the number of points having less than a critical value in terms of distance; that is, the number of points having less than threshold in terms of distance. [Mathematical formula 11] represents a process of measuring a distance between each point and a plane surface on the three dimension point cloud image.

Also, the control unit eliminates the points, having less than a critical value in terms of distance from the optimal plane surface, from the three dimension point cloud image (S75). That is, L (the optimal plane surface) is attained, and points among all the points within a certain distance from L are eliminated from the three dimension point cloud image so that a table or a floor area (where individual objects are placed on) may be eliminated from the three dimension point cloud image.

Figure 8A:
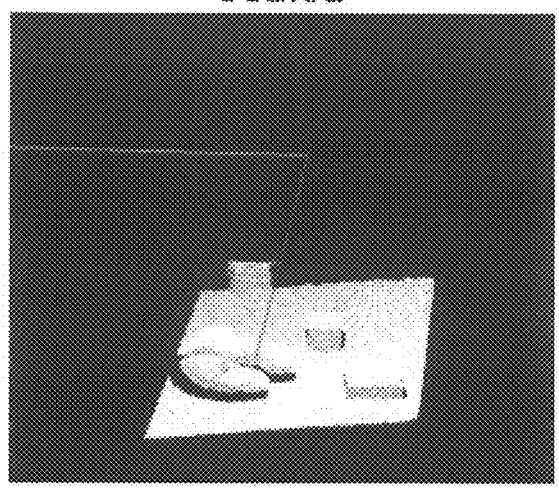
FIGS. 8A to 8C are views schematically showing a result in eliminating a plane surface area according to an embodiment.
Figure 8B:
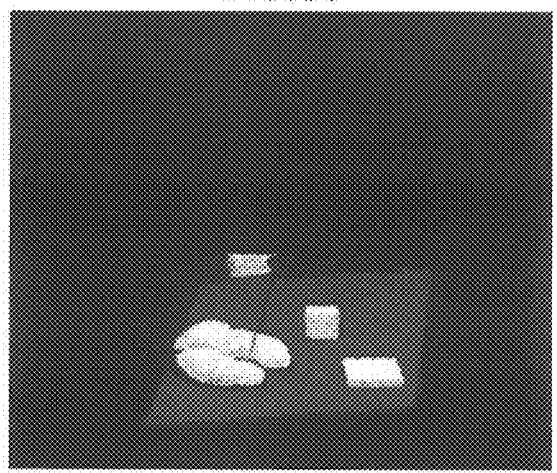
Figure 8C:
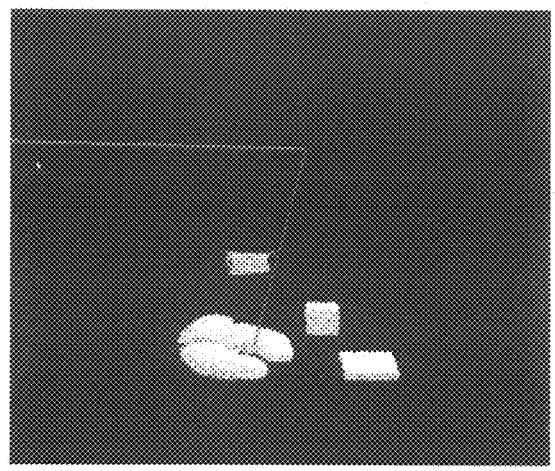

FIGS. 8A to 8C are views schematically showing a result of a process in eliminating a plane surface area according to an embodiment.

Referring to FIGS. 8A to 8C, a three dimension point cloud image without eliminating a plane surface area is shown in FIG. 8A. When a process of eliminating a plane surface area is performed on the three dimension point cloud image according to an embodiment, an optimal plane surface with largest number of points having less than a critical value in terms of distance from a plane surface, as shown in FIG. 8B, is selected. Also, the optimal plane surface area selected by such process coincides with a table area with individual objects are placed on, as illustrated on FIG. 8B.

FIG. 8C illustrates a three dimension point cloud image after eliminating a plane surface. If a process of eliminating a plane surface area is performed on the three dimension point cloud image according to an embodiment, a table area with individual objects are placed on is eliminated, so that an object may be more easily recognized.

FIG. 9 is a flow chart schematically illustrating a process of clustering points of an individual object according to an embodiment.

Referring to FIG. 9, the control unit performs an initial clustering process, as a part of a clustering process of point clouds of individual objects, by assigning a label to each point on the three dimension point cloud image (S91). The initial clustering process is performed by investigating all the points on the three dimension point cloud image, and also by assigning a same label to the points within a certain distance range which is less than predetermined distance. More details with reference to the initial clustering process will be explained more particularly in FIG. 10.

As a result of the initial clustering process, most point clouds are clustered such that a point cloud for an individual object is clustered as the same label. However, as for a certain object, the clustering of one object is composed of a plurality of objects, that is, one object may be clustered with a plurality of segments having different labels. Such takes place due to the fact that the direction of an initial clustering process coincides with the order of a point cloud, and as a result, a different label is assigned to a point due to a distant location, although the point is part of one object.

In order to improve such, the control unit matches each point cloud segment that is assigned with a same label, and calibrates each point cloud segment as a point cloud of one individual object (S92). More details in calibrating as point cloud of one individual object will be explained more particularly in FIG. 12.

Figure 10:
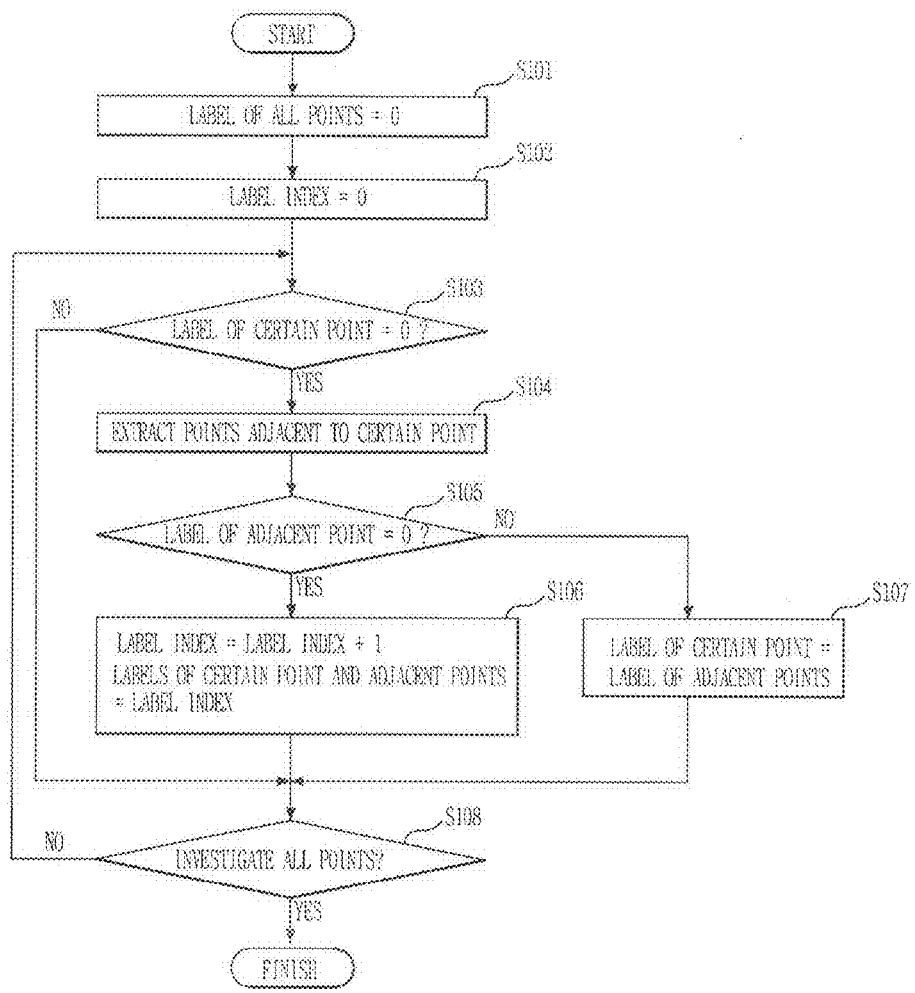
FIG. 10 is a flow chart schematically illustrating a process of assigning a label according to an embodiment.

FIG. 10 is a flow chart schematically illustrating a process of assigning a label according to an embodiment.

Referring to FIG. 10, first of all, an arrangement of point cloud labels that has same number of elements as points on the three dimension point cloud image is achieved. The arrangement of point cloud labels is generated according to the following [Mathematical formula 12], and shows which label a certain point belongs to:

$$P_i=\{p_1, p_2, \ldots, p_n\} \; B_i=\{b_1, b_2, \ldots, b_n\}$$  [Mathematical formula 12]

Here, Pi represents a set of remaining point clouds after eliminating a plane surface area, and Bi represents a set of having the labels assigned to each point as elements.

First, the control unit initializes the labels of all points at 0, and also initializes a label index at 0 (101 and 102). The control unit, while investigating all the points on the three dimension point cloud image, confirms if a label for a certain point is set at 0 as to determine whether the certain point is assigned with a label (103). In case that a label is not assigned to the point, the control unit extracts an adjacent point to the certain point (104). The adjacent point to the certain point represents a point which is positioned within a predetermined distance from the certain point, and such distance may be set differently, depending on the degree of clustering. In case that a label is assigned to the certain point, the control unit investigates a next point without assigning a label to the certain point.

The control unit confirms if a label is assigned to an adjacent point by determining if a label of the adjacent point is assigned with 0. In case that the label of the adjacent point is 0, the control unit increases label index by 1, and a label corresponding to the label index is assigned to the adjacent point and to the certain point (106). In case that the label of the adjacent point is not 0 but is assigned with a label, a control unit assigns the certain point with the same label as the adjacent point (107), as the determination is made that both the certain point and the adjacent point within a predetermined distance represent the same object.

The control unit determines if all the points on the three dimension point cloud image are investigated; in case that not all points are investigated, the control unit performs a process in assigning a label to a next point (108). However, if the number of adjacent points is less than a critical value, labels may not be assigned.

In general, a conventional method to assign labels on a two-dimensional image is to assign a same label by making a reference of the eight pixels that surround each pixel. That is, by increasing or decreasing a coordinate by 1 on the basis of the xy-coordinates of a particular pixel, the information of the surrounding pixels is used as reference. However, such method may not be applied on the three dimension point cloud image; therefore, according to an embodiment, a process in assigning labels makes a reference of the information of adjacent points that are assumed to represent a same object based on the distance between a certain point and an adjacent point.

FIGS. 11A to 11D are views schematically showing a process of assigning a label according to an embodiment.

Referring to FIGS. 11A to 11D, the certain point is marked with a red outline, and a range of adjacent points within a predetermined distance with reference to the certain point is marked with green area.

Figure 11A:
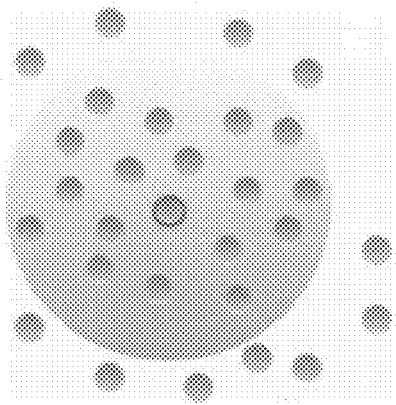
Figure 11B:
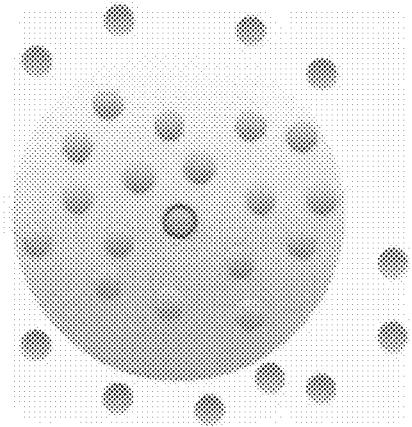

As illustrated on FIG. 11A, in case that the label of the certain point and the adjacent points are 0 and that both the certain point and the adjacent points are not assigned with labels, a label corresponding to a label index is assigned to the certain point and the adjacent points as illustrated on FIG. 11B. Here, the points that are assigned with the label corresponding to the label index is marked with yellow.

Figure 11C:
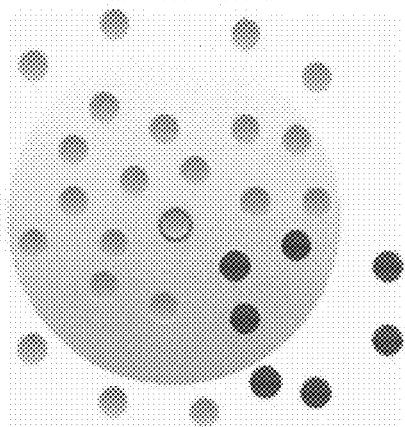

As illustrated on FIG. 11C, the label of the certain point is 0 without a label assigned; however, an adjacent point is assigned with a label, and marked with blue. In such case, as illustrated on FIG. 11D, the certain point and adjacent points that are not assigned with a label will be assigned with the same label as that of the adjacent point which has been assigned with a label. All the points within the green area, that is, the area that represents adjacent points, are assigned with the same label, and are marked with blue. The color of each point enables the points assigned with the same label to be schematically indicated.

FIG. 12 is a flow chart schematically illustrating a process in calibrating point clouds for an individual object.

Referring to FIG. 12, the control unit confirms if the labels of the certain point and the adjacent points are same while investigating all the points on the three dimension point cloud image (121). Here, the distance, that is, between the certain point and the adjacent point, which is used to select an adjacent point, is set in advance. Such distance is used to estimate whether an adjacent point cloud is composed of multiple segments but represents one object. The distance may be established differently, depending on circumstances.

If the certain point is assigned with a different label from that of the adjacent label, the control unit assigns the certain point and the adjacent point with one of the labels of the certain point and the adjacent point so that the certain point and the adjacent point are calibrated to a point cloud of one object (122). That, the certain point and the adjacent point may be assigned with a label of the certain point or a label of the adjacent point. Alternatively, the certain point and the adjacent point may be assigned with a new label. In this manner, point cloud segments assigned with the same label are matched to each other, thereby representing one individual object.

The control unit determines whether all the points on the three dimension point cloud image are investigated, and performs a calibration on a next point if all the points are not investigated (123).

Figure 13A:
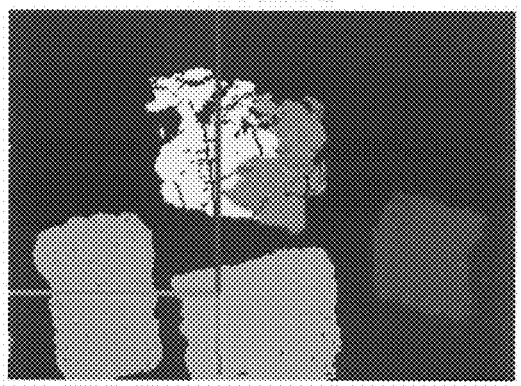
FIGS. 13A to 13B are views schematically showing a result of a process in calibrating point clouds for an individual object.
Figure 13B:
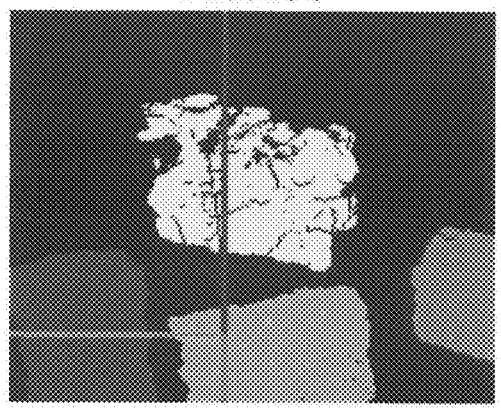

FIGS. 13A to 13B are views schematically showing a result of a process in calibrating point clouds for an individual object.

Referring to FIGS. 13A and 13B, a three dimension point cloud image which has not been subject to a calibration is shown in FIG. 13A. That is, each point cloud representing an individual object assigned with a same label through an initial clustering process are marked with same color; however, a certain object is separated into multiple segments, each having a respective label, marked with yellow, sky-blue, pink, red, and green.

Referring to FIG. 13Ba result of a calibration to an individual object point cloud through a matching on each point cloud segment according to an embodiment.

As illustrated, the adjacent points marked with sky-blue, pink, red, and green are assigned with the same label that the illustrated point cloud is assigned with, thereby calibrated as one point cloud of one individual object.

Processes, functions, methods, and/or software in apparatuses described herein may be recorded, stored, or fixed in one or more non-transitory computer-readable storage media (computer readable recording medium) that includes program instructions (computer readable instructions) to be implemented by a computer to cause one or more processors to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of non-transitory computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules that are recorded, stored, or fixed in one or more computer-readable storage media, in order to perform the operations and methods described above, or vice versa. The program instructions may be executed by one or more processors. In addition, a non-transitory computer-readable storage medium may be distributed among computer systems, computers, and computing devices connected through a network and computer-readable codes or program instructions may be stored and executed in a decentralized manner. In addition, the computer-readable storage media may also be embodied in at least one application specific integrated circuit (ASIC) or Field Programmable Gate Array (FPGA).

Although a few embodiments have been shown and described, it would be appreciated by those skilled in the art that changes may be made in these embodiments without departing from the principles and spirit of the disclosure, the scope of which is defined in the claims and their equivalents.

What is claimed is:

1. A method of separating an object in a three dimension point cloud, the method comprising:
    acquiring, using an image acquirer, a three dimension point cloud image on an object;
    eliminating, using a controller, an outlier from the three dimension point cloud image;
    eliminating, using the controller, a plane surface area from the three dimension point cloud image, of which the outlier has been eliminated; and
    clustering, using the controller, points of an individual object from the three dimension point cloud image, of which the plane surface area has been eliminated,
    wherein the clustering of points includes assigning a label to each point on the three dimension point cloud image by,
        extracting adjacent points that are within a desired distance with respect to each point on the three dimension point cloud image,
        assigning a same label to the each point and to the adjacent points if the number of the adjacent points is equal to or grater than a threshold value, the label being associated with the object, and
        matching each point cloud segment assigned with the same label, thereby calibrating to a point cloud of the individual object.

2. The method of claim 1, wherein the image acquirer comprises a stereo camera, a Time of Flight (TOF) camera, a Laser Range Finders (LRF) sensor, or a kinect sensor.

3. The method of claim 1, wherein in the eliminating of the outlier, whether a distance between each point of the three dimension point cloud image and nearby points adjacent to the each point is equal to or greater than a critical value is determined.

4. The method of claim 3, wherein the eliminating of the outlier comprises:
    extracting a desired number of nearest points with respect to each point of the three dimension point cloud image;
    measuring an average distance between the each point and the nearest points; and
    eliminating the each point and the nearest points if an average distance between the each point and the nearest points is equal to or greater than a critical value.

5. The method of claim 1, wherein in the eliminating of the outlier, if a distance between each point of the three dimension point cloud image and a position at which the three dimension point cloud image on the object is acquired is equal to or greater than a desired distance, the controller eliminates the each point.

6. The method of claim 1, wherein in the eliminating of the plane surface area, whether a distance between each point and a plane surface of the three dimension point cloud image is equal to or greater than a critical value is determined.

7. The method of claim 6, wherein the eliminating of the plane surface area comprises:
    extracting a desired number of plane surfaces, each plane surface passing through three points on the three dimension point cloud image, and measuring the number of points having a distance that is less than a critical value with respect to each plane surface on the three dimension point cloud image;
    selecting a plane surface having a largest number of points having a distance less than the critical value with respect to each plane surface; and
    eliminating each point in case when a distance between the each point on the three dimension point cloud image and the selected plane surface is less than the critical value.

8. The method of claim 1, wherein in the calibrating to a point cloud of an individual object, if a label of each point on the three dimension point cloud image is different from a label of an adjacent point that is within a desired distance with respect to the each point, the controller assigns the each point on the three dimension point cloud image and the adjacent point with same label.

9. The method of claim 1, wherein in the eliminating of the outliner, a downsampling is conducted on the three dimension point cloud image at a desired rate, and an outlier is eliminated from the three dimension point cloud image which has been downsampled.

10. The method of claim 9, wherein in the eliminating of the outlier, the controller determines if the distances between each point on the three dimension point cloud image and points adjacent to the each point are equal to or greater than a critical value.

11. The method of claim 10, wherein the eliminating of the outlier comprises:
   extracting a desired number of nearest points with respect to each point of the three dimension point cloud image;
   measuring an average distance between the each point and the nearest points; and
   eliminating the each point and the nearest points if the average distance is equal to or greater than a critical value.

12. The method of claim 9, wherein in the eliminating of the outlier, if a distance between each point on the three dimension point cloud image and a position at which the three dimension point cloud image on the object is acquired is equal to or greater than a desired distance, the controller eliminates the each point.

13. The method of claim 9, wherein in the eliminating of the plane surface area, the controller determines whether a distance between each point and a plane surface of the three dimension point cloud image is equal to or greater than a critical value.

14. The method of claim 13, wherein the eliminating the plane surface area comprises:
   extracting a desired number of plane surfaces, each plane surface passing through three points on the three dimension point cloud image, and measuring the number of points having a distance that is less than a critical value with respect to each plane surface on the three dimension point cloud image;
   selecting a plane surface having a largest number of points having a distance less than the critical value with respect to each plane surface; and
   eliminating each point in case when a distance between each point on the three dimension point cloud image and the selected plane surface is less than a critical value.

15. The method of claim 9, wherein in the calibrating to a point cloud of the individual object, if a label of each point on the three dimension point cloud image is different from a label of an adjacent point that is within a desired distance with respect to the each point, the controller assigns the each point and the adjacent point with same label.

16. At least one non-transitory computer readable medium storing computer readable instructions, which when executed by at least one processor, configures the processor to:
   acquire a three dimension point cloud image on an object;
   eliminate an outlier from the three dimension point cloud image;
   eliminate a plane surface area from the three dimension point cloud image, of which the outlier has been eliminated; and
   cluster points of an individual object from the three dimension point cloud image, of which the plane surface area has been eliminated, to assign a label to each point on the three dimension point cloud image by,
      extracting adjacent points that are within a desired distance with respect to each point on the three dimension point cloud image,
      assigning a same label to the each point and to the adjacent points if the number of the adjacent points is equal to or greater than a threshold value, the label being associated with the object, and
      matching each point cloud segment assigned with the same label, thereby calibrating to a point cloud of the individual object.

* * * * *